Jan. 1, 1924
H. PISTEMAA
SAW SETTING DEVICE
Filed Feb. 9, 1923
1,479,318
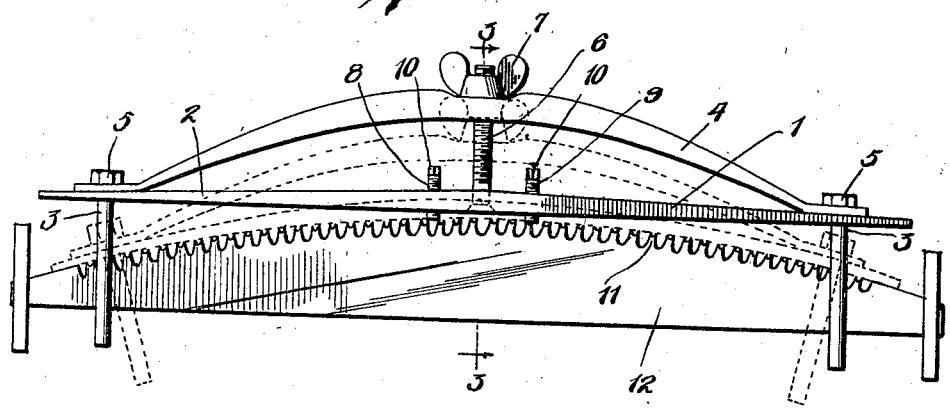
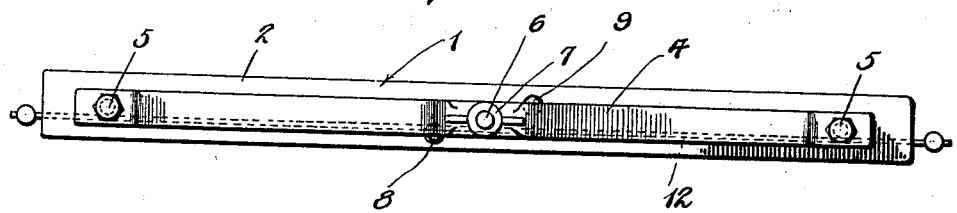
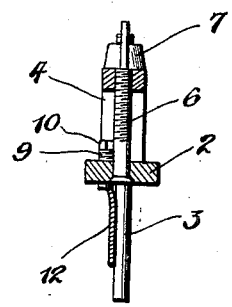
Inventor
Henry Pistemaa.
By F. P. Sorin
Attorney Patented Jan. 1, 1924.

1,479,318

UNITED STATES PATENT OFFICE.

HENRY PISTEMAA, OF POULSBO, WASHINGTON.

SAW-SETTING DEVICE.

Application filed February 9, 1923. Serial No. 618,063.

*To all whom it may concern:*

Be it known that HENRY PISTEMAA, a citizen of Finland, residing at Poulsbo, in the county of Kitsap and State of Washington, has invented certain new and useful Improvements in Saw-Setting Devices, of which the following is a specification.

This invention relates to an improvement in saw gauges, wherein the depth of the raker and cutting teeth may be accurately and correctly gauged.

The invention comprehends a single portable device which may be readily applied to the saw and adjusted to indicate the relative heights of the cutting teeth, so that these teeth may be properly filed to insure their uniformity, the device also including means by which the raker teeth may be subsequently gauged with respect to their proper heights and adjusted accordingly.

The invention is illustrated in the accompanying drawings, in which:

Fig. 1 is a view in elevation of the improved device, showing the same applied to a saw, the final position of the device in gauging relation to the saw being indicated in dotted lines.

Fig. 2 is a plan view of Fig. 1.

Fig. 3 is a section on line 3—3 of Fig. 1.

The improved device comprises what may be termed a gauge plate 1 preferably of more or less resilient spring steel and presenting a plain straight under surface 2. Guide posts 3 are threaded in the gauge plate 1 and extend below the same to bear against the side of the saw in the use of the device, as will later appear. A flexible bow member 4 is arranged above the gauge plate 1, the terminals of which are secured upon the posts 3 by nuts 5. The bow member at its central portion is connected with the gauge plate by a bolt 6 secured against upward movement relative to the gauge plate and passing through the bow and threaded beyond the same to receive an adjusting wing nut 7. Set screws 8 and 9 are threaded through the gauge plate adjacent its central portion, these screws being arranged on opposite sides of the longitudinal median line as shown in Fig. 2, and each set screw having a non-circular head 10 for the application of a wrench or other turning implement.

In the use of the device, the gauge plate 1 in its normal straight position is placed upon the teeth 11 of the saw 12, the posts 3 bearing against the side of the saw as a guide. The wing nut 7 is turned until the central portion of the gauge plate is bowed to a degree to cause the curvature of such plate to conform to the curvature of the teeth of the saw. The operator is thus provided with a uniform curvature edge with which the cutting edges of the teeth must coincide in order that such teeth may be of uniform cutting depth. By glancing along the lower surface of the gauge plate, any projecting or deficient long tooth may be readily determined, and if too long, filed away to reduce its length and if too short, the remaining teeth may be adjusted accordingly. There will thus be provided a means by which the absolutely uniform cutting depth of the cutting teeth may be readily gauged and made uniform, as will be apparent. In connection with the raker teeth, which are of course somewhat shorter than the cutting teeth, one or the other of the bolts 8 or 9 is adjusted to the proper projection below the gauge plate to determine the proper depth of the raker teeth. As the curvature of the saw is uniform, the raker tooth gauge thus provided may be readily brought into cooperation with the successive raker teeth and the latter adjusted by bending or re-forming to a proper depth as indicated by such gauge.

The two gauging screws 8 and 9 are provided, one to be used with the raker teeth of a falling saw, and the other to be used with the raker teeth of a bucking saw, for which reason these adjusting screws are relatively off set as shown.

It is apparent from the above that the implement provides for the convenient gauging of the depth of the cutter and raker teeth, and that particularly in connection with the cutting teeth the plain surface of the gauging plate resting upon the extreme ends of these teeth provides for a clear vision of the operator in the plane between that surface and any shorter tooth, thus clearly indicating even to a microscopic degree, the failure of a particular tooth or teeth to touch the surface of a gauge plate.

Claims:

1. A saw gauge, comprising a flexible gauging plate, means for flexing said plate to conform to the curvature of the saw, and means carried by said plate for gauging cooperation with certain teeth.

2. A saw gauge, comprising a flexible gauging plate, a bow member arranged above the plate and having its ends rigidly secured thereto, and a bolt extending from the plate and through the bow, and means on said bolt to cause the plate and bow to approach each other to provide a curvature in the plate to conform to the curvature of the saw.

3. A saw gauge, comprising a flexible gauging plate having a lower gauging surface, means for flexing said plate to conform to the curvature of the saw, and gauge screws adjustable in said plate to project below the gauging surface thereof.

4. A saw gauge, comprising a flexible gauging plate having a lower gauging surface, means for flexing said plate to conform to the curvature of the saw, and gauge screws adjustable in said plate to project below the gauging surface thereof, said gauge screws being on opposite sides of the longitudinal median line of the plate.

5. A saw gauge, comprising a flexible gauging plate, means for flexing said plate to conform to the curvature of the saw, means carried by said plate for gauging cooperation with certain teeth, and posts depending from the plate to bear against the side of the saw blade in positioning the plate relatively to the saw blade.

In testimony whereof I affix my signature in the presence of two witnesses.

HENRY PISTEMAA.

Witnesses:
Wm. Kippo,
C. E. Byron.